United States Patent [19]

Beasley

[11] 3,829,740

[45] Aug. 13, 1974

[54] COOLING ARRANGEMENT FOR A DIRECT CURRENT POWER SUPPLY

[75] Inventor: Jack O. Beasley, Indianapolis, Ind.

[73] Assignee: The Buehler Corporation, Indianapolis, Ind.

[22] Filed: July 9, 1973

[21] Appl. No.: 377,529

[52] U.S. Cl. ............... 317/100, 321/8 C, 174/15 R, 310/68 D

[51] Int. Cl. ............................................ H05k 7/20

[58] Field of Search........... 321/8 R, 8 C; 310/68 D; 317/100; 336/61; 174/15 R, 16 R; 165/105

[56] References Cited

UNITED STATES PATENTS

| | | | |
|---|---|---|---|
| 854,278 | 5/1907 | Darlington | 174/15 R |
| 3,248,636 | 4/1966 | Colaiaco | 321/8 C |
| 3,517,730 | 6/1970 | Wyatt | 174/15 R |
| 3,609,991 | 10/1971 | Chu et al. | 174/15 R |

*Primary Examiner*—Robert K. Schaefer
*Assistant Examiner*—Gerald P. Tolin
*Attorney, Agent, or Firm*—Trask, Jenkins & Hanley

[57] ABSTRACT

Apparatus and method for dissipating the heat generated by the components of a power supply. The components can be isolated from one another in a plurality of sealed compartments. Each isolated component can be thermally connected to a heat pipe which is operative to transfer heat generated by the respective component out of its sealed compartment to a heat sink which is in communication with ambient air currents.

26 Claims, 9 Drawing Figures

COOLING ARRANGEMENT FOR A DIRECT CURRENT POWER SUPPLY

BACKGROUND OF THE INVENTION

This invention generally relates to direct current power supplies wherein solid state devices are employed as rectifiers. More specifically, this invention relates to an improved arrangement for conveying any generated heat away from the components of a direct current power supply.

Solid state devices such as silicon diodes and silicon controlled rectifiers (SCR's) are commonly used to convert alternating current to direct current in supplies having a high power output rating. The solid state devices and the transformer typically generate large amounts of heat during normal operation, which affects their operating characteristics. Thus, the performance of these components is highly dependent upon how efficiently the large amounts of generated heat can be dissipated over long time periods.

In the past, ambient air has been commonly used to cool the solid state devices and transformers. The use of air, however, has not been satisfactory because the components must be exposed to the air on several sides and several fans are required to move a large amount of air over the components to cool them. The requisite air flow over and around each of the components, and the relatively large fans required to effect this flow, result in a large and bulky power supply. Furthermore, the required fans consume relatively large amounts of electrical power. Ambient air cooling is further undesirable in that the components may not be isolated in sealed compartments. Isolating the components is particularly desirable in many instances, such as in electroplating, where the ambient air can contain water vapor or harmful chemicals. The required contact between the ambient air and the components can, in those instances, cause corrosion and degradation of the components rendering them inoperable.

More recently, direct current power supplies have been developed which utilize circulating water or other heat transfer fluids to remove heat generated by the transformers and the solid state devices. A distinct advantage of using circulating water is that the components can be isolated in sealed compartments away from any contact with the ambient air to reduce corrosion problems. However, the pump and tubing networks required to circulate the water to the components to provide adequate cooling of the power supply objectively increases both the size and the cost of the unit. Further, the relatively large amount of water required for sufficient cooling also makes the circulating fluid approach even more economically undesirable.

It is therefore desirable to provide a power supply of compact construction which has its transformers and solid state devices mounted within sealed compartments away from contact with ambient air, but which still utilizes ambient air, in relatively small amounts, to efficiently and economically cool the transformers and the solid state devices.

SUMMARY OF THE INVENTION

In accordance with the present invention, a power supply for providing relatively large amounts of direct current power from an alternating current source is provided which comprises a transformer and a plurality of solid state rectifying devices connected thereto. The transformer and the solid state rectifying devices can be isolated within sealed compartments away from contact with ambient air and can be thermally connected to a heat pipe. The heat pipe has a heat sink mounted thereon, external to the component compartments and in communication with ambient air.

Heat generated by the transformer and each of the solid state devices is isothermally transferred through the heat pipe thermally connected thereto to the heat sink. A small electrical fan can be utilized to provide ambient air flow over the heat sink to effectively dissipate the heat.

BRIEF DESCRIPTION OF THE DRAWINGS

The accompanying drawings illustrate the invention. In such drawings.

DETAILED DESCRIPTION OF THE PREFERRED EMBODIMENT

Figure 1:
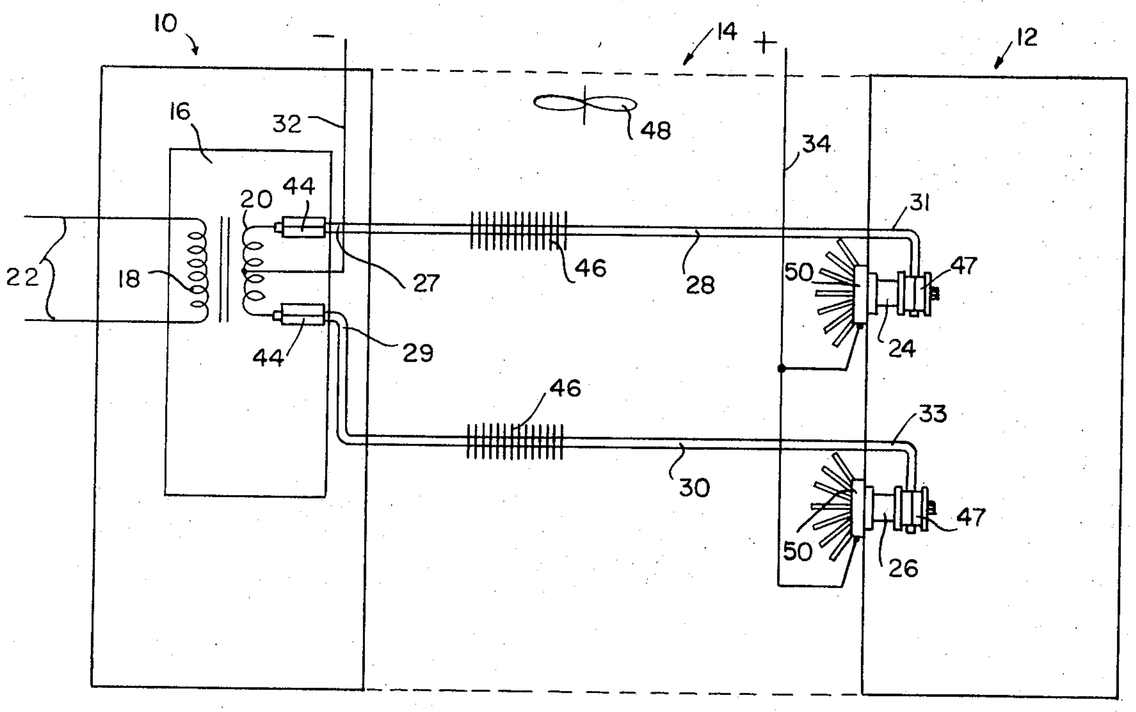
FIG. 1 is a schematic diagram illustrating a single-phase power supply embodying the invention.

FIG. 1 shows a single-phase direct current power supply employing two solid state devices to obtain full-wave rectification of voltage from an alternating current source. In general, the power supply comprises a sealed transformer compartment 10, a sealed rectifying compartment 12, and an open heat dissipation compartment 14.

A transformer 16 having a primary winding 18 and a secondary winding 20 is mounted within the sealed transformer compartment 10. The primary winding 18 is electrically connected by leads 22 to a single-phase source of alternating current, which may be unregulated or regulated in a conventional manner as the particular application may require. The scondary winding 20 is electrically connected to a pair of silicon diodes 24 and 26 mounted within the sealed rectifying compartment 12 to obtain full-wave rectification of the alternating current. The negative portion of the direct current output is taken from a center tap 32 in the secondary winding 20 of the transformer, and the positive portion of the direct current output is taken from a common output lead 34 which is coupled to both diodes 24 and 26.

For the power supply to operate efficiently for sustained time periods the heat generated in the windings 18 and 20 of the transformer 16 and in the silicon diodes 24 and 26 must be effectively dissipated to prevent premature failure of these components. In accordance with the invention, the transformer 16 and the diodes 24 and 26 are mounted within separate sealed compartments 10 and 12, and the heat generated by these components is transferred out of their respective sealed compartments 10 and 12 and is dissipated in the open dissipation compartment 14. Transfer of the heat from the components to the dissipation compartment is facilitated by the use of a heat pipe, which can be formed of copper to permit the pipe to also be used to appropriately interconnect the transformer and the diodes to complete the electrical circuit.

Figure 2:
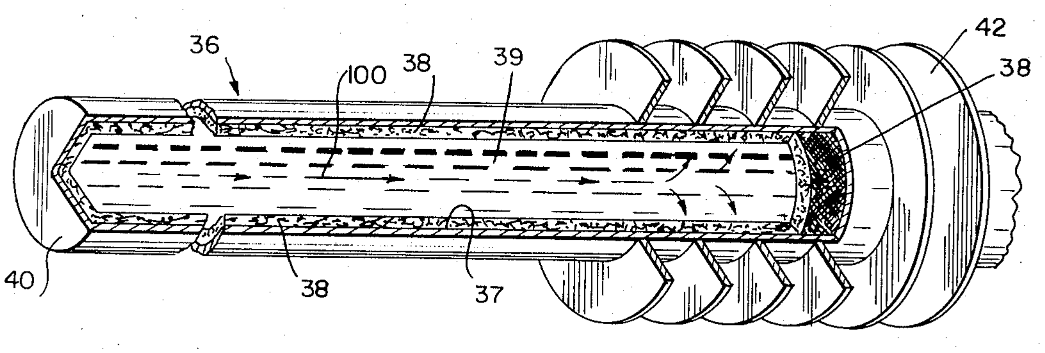
FIG. 2 is an enlarged view, in partial section, of a heat pipe used in the invention.

A heat pipe is shown in detail in FIG. 2 and comprises a sealed, evacuated pipe 36 which is preferably formed of an electrically conductive material such as copper. The inner walls 37 of the pipe 36 are lined with a capillary structure, or wick 38, which is formed of copper mesh or a like material. A volatile fluid 39 is contained within the pipe and saturates the wick 38. By way of example, when one end 40 of the heat pipe is exposed to a source of heat, such as a solid state device or a transformer winding, the fluid 39 within the pipe adjacent the exposed end 40 absorbs the heat and is vaporized. A resultant vapor pressure differential is generated within the pipe which causes the vapor to migrate away from the heat exposed end 40 and toward a cooler portion of the pipe. This migration is shown by arrows 100 in FIG. 2. Capillary action causes liquid in the cooler portion of the pipe to be pumped through the wick 38 back toward the exposed end 40. A plurality of heat dissipation fins 42 forming a heat sink are mounted on the heat pipe away from its heat exposed end 40 to dissipate the heat carried by the vapor and to re-condense the vapor to a liquid. The position of these heat fins 42 thereby define the cooler portion of the heat pipe referred to above.

Capillary action causes the re-condensed liquid to be pumped back toward the heat exposed end of the pipe where the liquid is again vaporized. In this manner, a heat pipe continuously absorbs heat from a heat source, and transfers the heat, without significant heat loss at intervening points along the pipe, to a remote point where the heat may be dissipated in a convenient and economical fashion.

The ultimate heat transfer capacity of a heat pipe is largely determined by the size and the geometry of the wick 38, and the latent heat of vaporization of the volatile fluid 39. Conveniently, the fluid should be selected to have a latent heat of vaporization close to the desired operating temperature of the particular device which is desired to be cooled. This selection is made so that vaporization of the fluid, with its accompanying absorption of thermal energy, will be assured without large temperature variations in the fluid.

Desirably, the heat pipe is horizontally mounted to minimize gravitational effects on the volatile fluid to maximize capillary pumping action, although the heat pipe may be mounted vertically and operated in opposition to gravity. A heat pipe formed from copper has been found to be the most advantageous for use in a direct current power supply, since a copper pipe can conduct both electrical current and thermal energy. This reduces the number of circuit elements by replacing some of the required electrical conductors.

In the power supply of FIG. 1, the heat pipes 28 and 30 are electrically and thermally connected to opposite ends of the secondary transformer winding 20 by a saddle 44 or like clamping device. Each saddle 44 is desirably formed of two opposed slabs of copper which together have a cavity for receiving the end 27 of 29 of a heat pipe 28 or 30. The slabs are tightly clamped over the end 27 or 29 of the heat pipe and the respective end of the transformer winding 20 to assure electrical contact between the winding and the respective pipe. In addition, each saddle 44 is disposed in close thermal proximity to the transformer windings 18 and 20 to provide a broad heat transfer surface area near the end 27 or 29 of each heat pipe 28 or 30 so that heat generated in the windings 18 and 20 is effectively absorbed by the respective heat pipe. The absorbed heat causes the fluid in the ends 27 and 29 of the pipes 28 and 30 to vaporize. This vaporization, as explained above, serves to transfer the heat through the heat pipes, out of the sealed transformer compartment 10 and into the open dissipation compartment 14. A plurality of heat dissipation fins 46 are mounted on each of the heat pipes 28 and 30 within the open dissipation compartment 14 to dissipate the heat that has been transferred from the transformer 16 and sealed transformer compartment 10. A small electrical fan 48 can be used, if desired, to blow ambient air through the open dissipation compartment 14 to increase the heat transfer rate from the fins 46.

The heat pipes 28 and 30 are each electrically and thermally connected at their ends 31 and 33 opposite the transformer 16 to the respective anodes of the diodes 24 and 26 by saddles 47 or like clamping devices which can be identical to the saddle 44 used with the transformer secondary 20. The saddles 47 are pressure-mounted to the anode of each diode to assure electrical contact between each diode 24 and 26 and its associated saddle 47, and to provide a broad heat transfer surface between the heat pipes 28 and 30 and the respective diode 24 and 26. The cathode of each diode 24 and 26 is electrically and thermally connected to an electrically conductive heat sink 50 which is formed of a good heat transfer material such as aluminum and is disposed within the open dissipation compartment 14.

Figure 8:
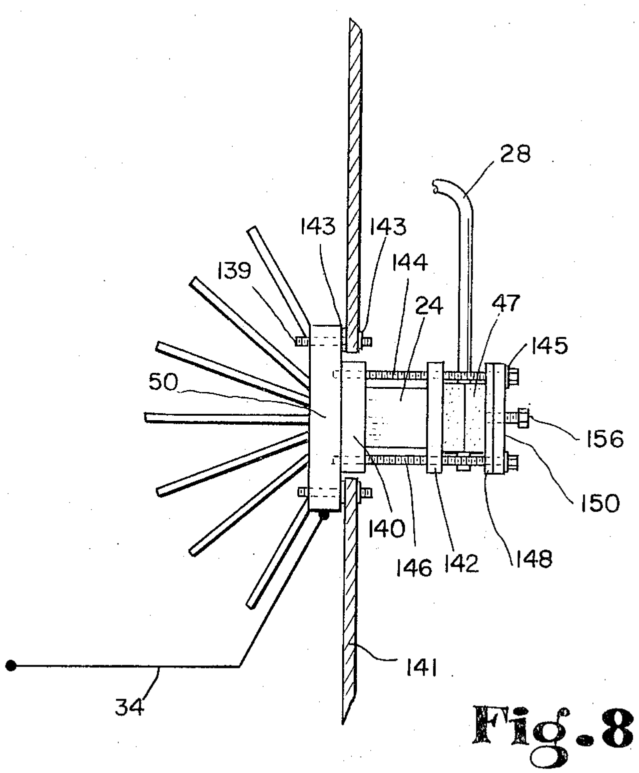
FIG. 8 is an enlarged view showing a clamping arrangement between a heat pipe, a solid state device, and an auxiliary heat sink.

More specifically, and by way of example, FIG. 8 shows the preferred arrangement for pressure-connecting the heat pipe 28 and the heat sink 50 to opposite sides of the top diode 24, shown in FIG. 1. The heat pipe 28 is tightly clamped within the two part saddle 47 by bearing plates 142 and 148 and a spring plate 150. The clamping pressure is provided by tie rods 144 and 146 which extend through the spring plate 150, the bearing plates 142 and 148, and a third bearing plate 140 before being threadably received in the heat sink 50. The holes in all the plates are larger than the diameter of the tie rods 144 and 146 to electrically isolate the plates from the rods, and the spring plate 150 is likewise isolated from the tie rods by non-conductive washers 145.

The diode 24 is disposed and held tightly in position between the middle and left hand bearing plates 142 and 140 as shown in FIG. 8. The middle plate 142 makes electrical and thermal contact with the anode of the diode 24 thereby electrically and thermally coupling the anode to the saddle 47 and heat pipe 28.

The left hand bearing plate 140 is clamped between the cathode of the diode 24 and heat sink 50 by the clamping action of the tie rods 144 and 146 to provide thermal and electrical coupling between the cathode and the heat sink 50. The heat sink 50 is mounted on the common wall 141 between the rectifying compartment 12 and the dissipation compartment 14 and within the latter compartment 14 by screws 139 which are electrically isolated from the wall 141 by gaskets 143. The positive output lead 34 can be connected to the heat sink.

If desired, a pressure distribution adjusting screw 156 can be threadably received through the spring plate 150 to bear against the right hand bearing plate 148 to evenly distribute and adjust the pressure between the various bearing plates 140, 142 and 148.

Heat generated by the diodes 24 and 26 is transferred out of the sealed rectifying compartment 12 through the anodeconnected heat pipes 28 and 30 and the cathode-connected heat sinks 50 to be dissipated in the dissipation compartment 14. The small electrical fan 48 has been found to provide sufficient ambient air currents over the fins 42 mounted on the heat pipes and the pair of heat sinks 50.

The above described cooling arrangement for the transformer and the solid state devices of a direct current power supply enables the essential circuit components to be completely enclosed within sealed compartments. This is a particularly desirable feature when the power supply is to be used in applications such as electroplating wherein the components may be corroded by large amounts of water vapor or harmful chemicals present in the air immediately surrounding the power supply. Furthermore, only a small amount of induced ambient air flow has been found necessary to dissipate the heat which is conveyed to the fins 46 and the heat sinks 50 in the dissipation compartment 14, thereby eliminating the need for a plurality of fans as is conventionally required. The physical size of the power supply can be relatively small since large cooling air chambers surrounding each component or intricate cooling fluid piping networks connected to each component are not required. The sealed compartments need be no larger than the physical size of the contained component plus the necessary clearance for electrical and heat pipe connections therewith.

Figure 3:
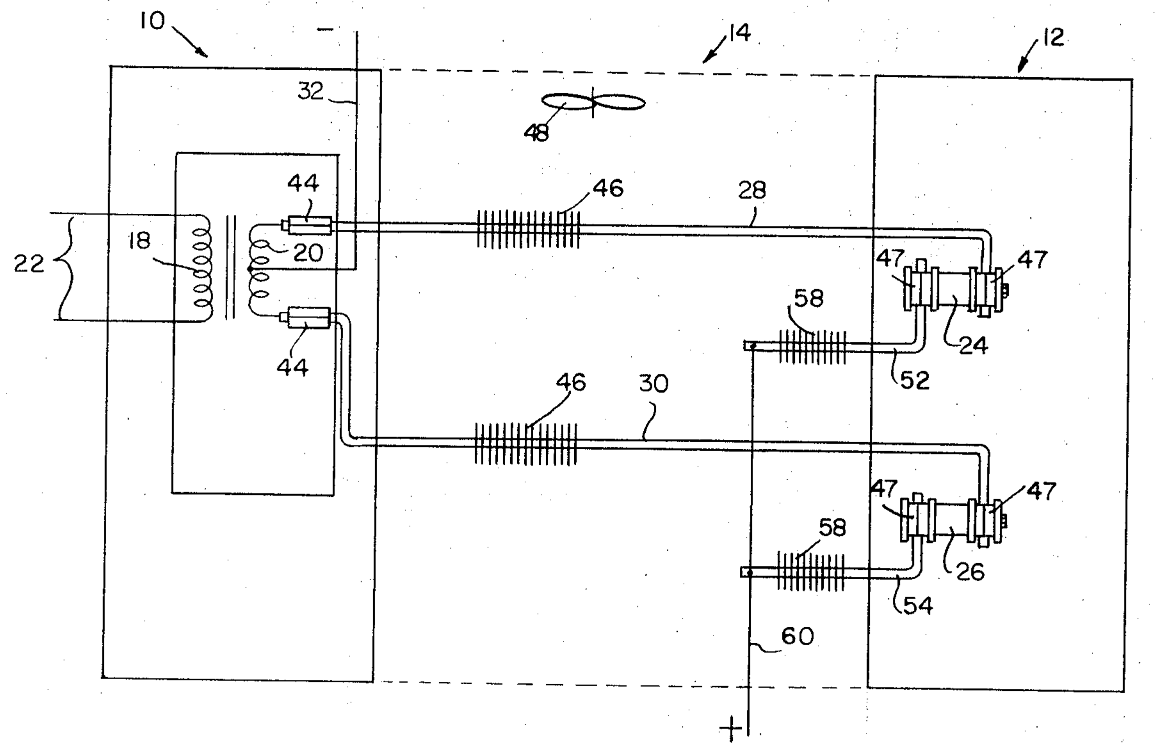
FIG. 3 is a schematic diagram of an alternative embodiment of the power supply of FIG. 1.

An alternate cooling arrangement for a single-phase full-wave rectifying power supply is shown in FIG. 3, and differs from the power supply of FIG. 1 only in that the cathode of each diode 24 and 26 is connected electrically and thermally to a heat pipe rather than a conventional heat sink. As shown in FIG. 3, heat pipes 52 and 54 are conventionally pressure-connected by saddles 47, identical to the ones previously described, to the cathodes of the diodes 24 and 26, respectively. The saddles 47 provide a broad heat transfer surface between the cathode of each diode 24 and 26 and its associated heat pipe 52 and 54, so that each heat pipe transfers heat from the respective diode out of the sealed rectifying compartment 12. Heat dissipation fins 58 are mounted on the heat pipes 52 and 54 within the open dissipation compartment 14, and ambient air is blown by the fan 48 across the fins 58 to dissipate the heat emanating therefrom. The heat pipes 52 and 54 are electrically connected to an electrical lead 60 to provide the positive portion of the power supply output.

Figure 9:
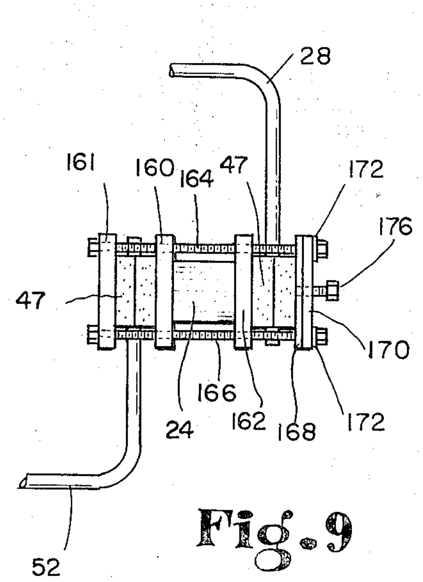
FIG. 9 is an enlarged view showing a clamping arrangement between a solid state device and two heat pipes.

A preferred way of pressure-connecting heat pipes to both sides of a diode is shown in detail in FIG. 9. For ease of description, only the heat pipe connections to the top diode 24 is shown by way of example as the connections for the bottom diode 26 are identical thereto. Diode 24 is sandwiched getween a pair of bearing plates 160 and 162. One of these plates 162 is in electrical and thermal contact with the anode of the diode 24 and with one side of a saddle 47. The saddle is tightly clamped around the heat pipe 28 by the sandwich arrangement of the plate 162 and a third bearing plate 168 and a spring plate 170. The cathode of the diode 24 is electrically and thermally coupled to a second saddle 47 by means of the other bearing plate 160. This saddle 47 is tightly clamped around the cathode associated heat pipe 52 by the latter bearing plate 160 and a fourth bearing plate 161. All four bearing plates 161, 160, 162 and 168 as well as the spring plate 170 are maintained in a tightly clamped condition by a pair of tie rods 164 and 166 passing therethrough. The holes in all the plates are larger than the diameter of the tie rods 164 and 166 to permit electrical isolation between the plates and the rods. Washers 172 are provided to insulate the threaded nuts 174 which serve to secure the tie rods firmly in place.

While silicon diodes have thus far been described as the preferred solid state rectifying device, it is well within the scope of this invention to replace the silicon diodes with silicon controlled rectifiers (SCR's), or any other solid state rectifying device. With SCR's in the transformer secondary circuit, the power supply output may be readily rectified and optionally controlled by individually gating the SCR's in a conventional manner to eliminate any need for voltage control or regulation on the primary side of the transformer. It is also within the scope of this invention to connect diodes or SCR's, or an operable combination thereof, in a conventional single-phase full-wave rectifying bridge circuit as is well known in the art, to obtain a direct current output.

Figure 4:
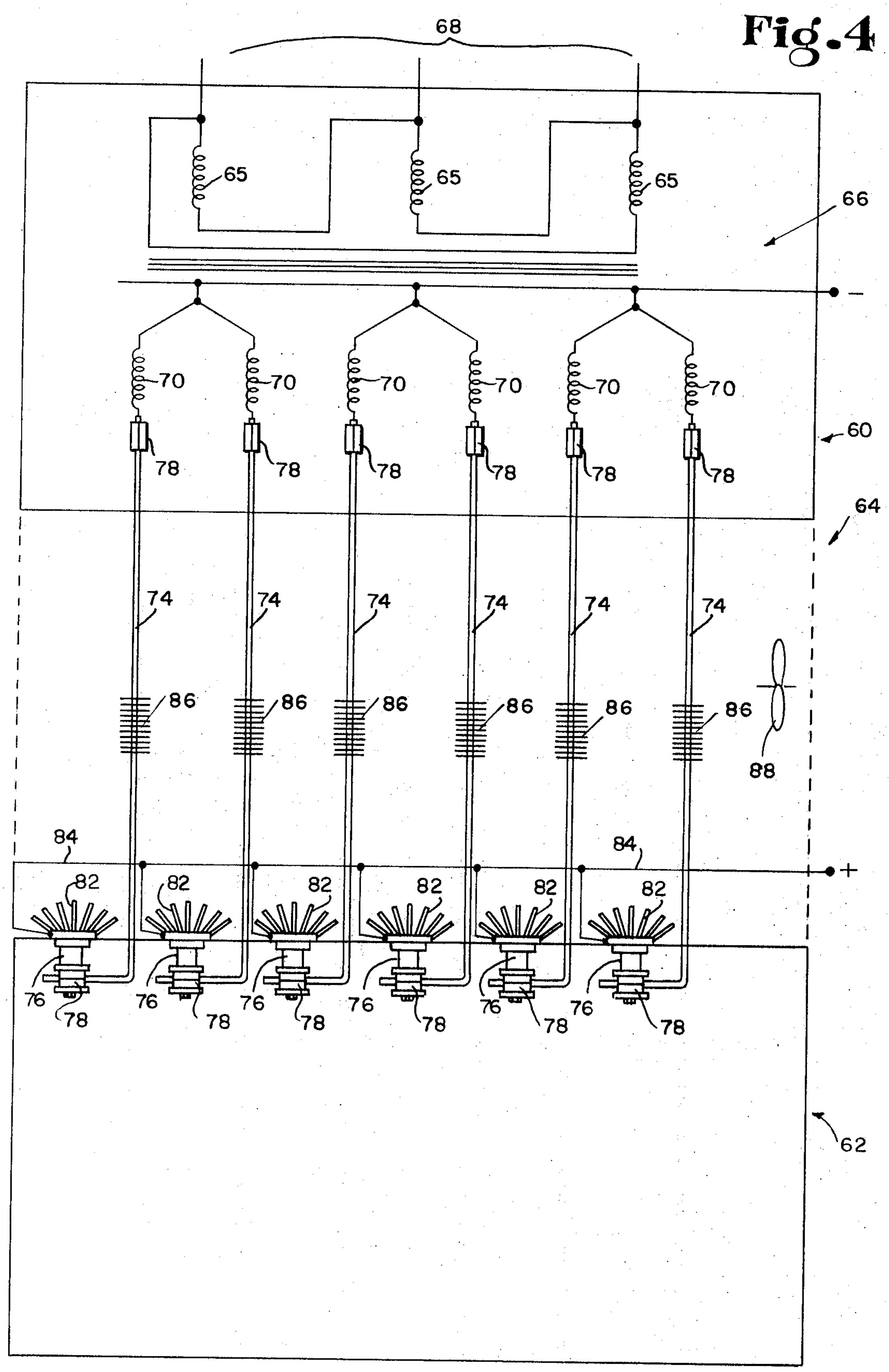
FIG. 4 is a schematic diagram illustrating a three-phase power supply embodying the invention.

An embodiment of a three-phase direct current power supply of the invention is shown schematically in FIG. 4, and generally comprises a sealed transformer compartment 60, a sealed rectifying compartment 62, and an open heat dissipation compartment 64. Three-phase alternating current is supplied by leads 68 to the primary windings 65 of a three-phase transformer 66. The secondary windings 70 can be connected in a conventional star configuration. A center tap lead 72 is connected to each secondary winding 70 to provide the negative portion of the three-phase power supply output, and each end of each secondary winding 70 is electrically connected by means of a heat pipe 74 to a diode 76 mounted within the sealed rectifying compartment 62. As in the single-phase embodiment, a saddle 78, or like clamping device, is utilized to electrically connect one of the heat pipes 74 to each end of each secondary phase winding. The saddles 78 are again preferably formed of copper, are tightly clamped over the end of the heat pipe and the end of the winding to assure electrical contact, and are disposed in close thermal contact with the secondary windings 70 to provide broad heat transfer surfaces between the windings and the heat pipes. Each heat pipe 74 extends through the wall of the sealed transformer compartment 60, through the heat dissipation compartment 64, and into the sealed rectifying compartment 62, where each pipe 74 is electrically and thermally connected to the anode of its associated diode 76 by an identical saddle 78 or like clamping device. The cathode of each diode 76 is electrically and thermally pressure-connected to a heat sink 82, formed of an electrically conductive material and disposed within the open dissipation compartment 64. The diodes 76 may each be connected between a heat pipe and a heat sink in a manner similar to that shown in FIG. 8, or in any other manner to assure electrical and thermal contact between the elements. The cathodes of the diodes 76 are electrically coupled through the heat sinks 82 to a lead 84 to provide the positive portion of the power supply output.

In operation of the three-phase power supply of FIG. 4, heat generated in the transformer windings is transferred out of the enclosed transformer compartment 60, and through the heat pipes 74 to a plurality of heat dissipation fins 86 mounted on each heat pipe 74 within the open dissipation compartment 64. Heat generated by the diodes 76 is transferred from the anode side of each diode out of the sealed rectifying compartment 62 to the same dissipation fins 86 mounted on each heat pipe. Heat is transferred from the cathode side of each diode through the compartment wall to the heat sinks 82. A small fan 88 is provided in the dissipation compartment 64 to blow ambient air across the fins 86 and and the heat sinks 82 to effectively cool the power supply.

This cooling arrangement for a three-phase power supply permits the transformers and the diodes to be economically cooled by relatively small ambient air flow, yet the components are isolated in their sealed compartments and are never in contact with the cooling air. This arrangement thereby permits this power supply to be used in applications such as electroplating without fear of component corrosion. Another advantage of this arrangement is that the components may be mounted within sealed modules of a relatively small size, since heat generated by the components is not dissipated at the component locations, but is remotely removed. This substantially reduces the space requirements and the cost of the power supply.

The three-phase embodiment shown in FIG. 4 may be modified to a full heat pipe arrangement that is analogous to the single-phase embodiment shown in FIG. 3. Such a modification would include a heat pipe thermally and electrically connected to the cathode size of each diode in place of a heat sink. As before, the ends of the additional pipes would be mounted in a saddle, and the saddle would be pressure-mounted to the diode as in the manner shown in FIG. 9, to assure electrical contact and heat transfer between the diodes and the heat pipes. Each additional heat pipe would have heat dissipation fins mounted thereon disposed within the open dissipation compartment 64 where they too would be subjected to cooling air currents. The cathode side of each diode would be electrically coupled through the heat pipes to an electrical lead to provide the positive portion of the power supply output.

It has been found that heat pipes of the size and construction previously described are extremely effective and economical in cooling either single-phase or three-phase power supplies having an output power rating on the order of 18 to 24 KVA while desirably maintaining the transformers and the solid state devices in separated compartments. The present method of dividing a power supply into two or more individual isolated heat sources reduces the amount of heat that is concentrated in any single area and thereby makes the dissipation of the heat more efficient. Several power supplies of the type embodied in the invention can be readily stacked one on the other and electrically connected in parallel or in series to provide greater output power, if desired. All of the power supplies can then share a common heat dissipation compartment and a single fan can be used to circulate air through the dissipation compartment to effectively cool all of the components. The result is a power supply that is smaller in size than those previously available, that flexibly fits a wide range of low or high power applications, and has all the critical components protected in sealed compartments for prolonged life and easy maintenance.

As in the single-phase embodiments, silicon controlled rectifiers (SCR's) or any other solid state rectifying devices may be utilized in lieu of diodes in the rectifying compartment of a three-phase power supply of the invention. In the case of SCR's, the SCR's would be gated in a conventional manner so that they would both optionally control and rectify the power supply output thereby eliminating the need for any voltage regulation or control on the primary side of the transformer.

Figure 5:
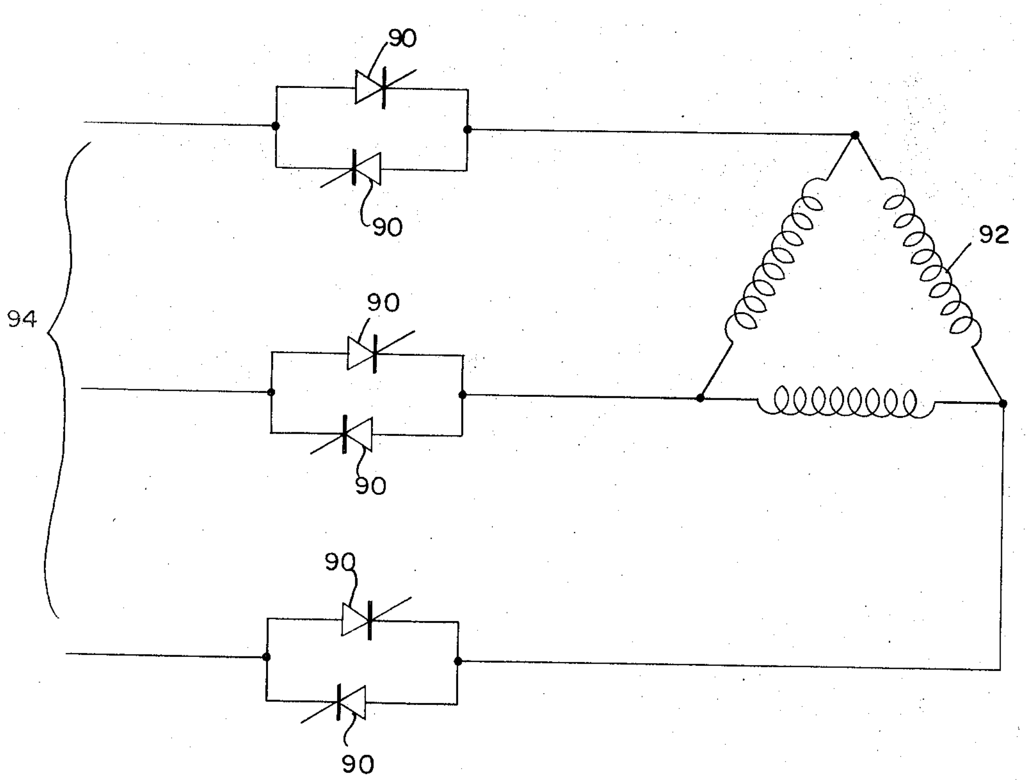
FIG. 5 is an electrical schematic diagram of a three-phase primary winding control circuit for a three-phase power supply.

In some power supplies, diodes are the rectifying elements used in the transformer secondary circuit to rectify the output, and separate means are provided in the primary circuit of the transformer to control the output voltage of the power supply in relation to varying current demands. Silicon controlled rectifiers are the most commonly used devices for primary control and are gated in a manner well known in the art to optionally control the output voltage. FIG. 5 is a circuit diagram showing back-to-back SCR's 90 connected to a delta transformer 92 in a conventional in-line circuit. Three-phase power is supplied to the transformer 92 by leads 94, and the primary input is regulated by the back-to-back SCR's 90 to thus control the power supply output.

Heat pipes can be used to economically cool these back-to-back regulating and controlling SCR's in the transformer primary circuit to permit these SCR's to be isolated in a sealed compartment away from contact with ambient air thereby preventing corrosion.

Figure 6:
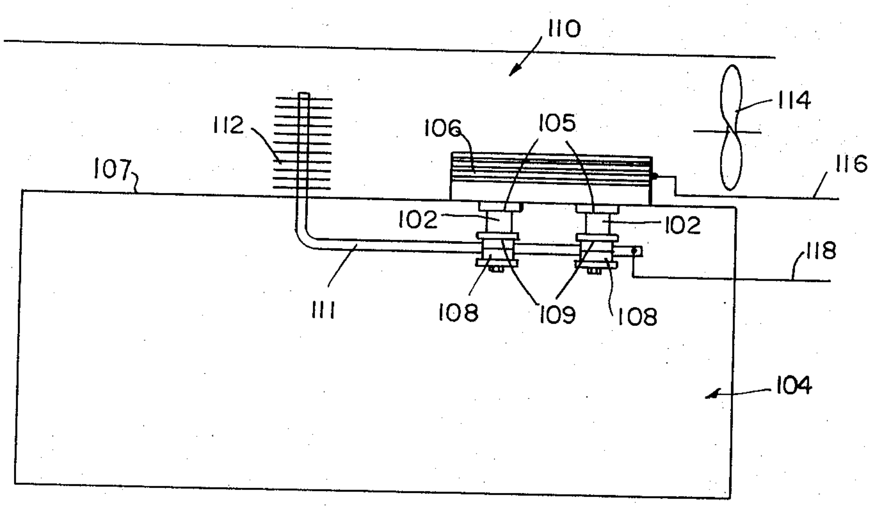
FIG. 6 is a schematic diagram illustrating the physical arrangement of the solid state devices of the control circuit of FIG. 5.

One physical arrangement for cooling back-to-back connected SCR's is shown in FIG. 6. A pair of back-to-back SCR's 102 is mounted within a sealed compartment 104 and each of these SCR's is electrically and thermally coupled on one side 105 to an electrically conductive heat sink 106, which is pressure-mounted to the SCR's and mounted on the compartment wall 107 within a dissipation compartment 110. The other sides 109 of the SCR's are electrically and thermally coupled to an electrically conductive heat pipe 111 which is mounted in contact with each SCR by a saddle or like clamping device. A saddle 108 and the heat sink 106 may be pressure-mounted on an SCR in a manner similar to that shown in FIG. 8 to provide a broad heat transfer surface and to assure electrical contact between the SCR and the heat pipe and heat sink. The heat sink 106 is disposed within the heat dissipation compartment 110, and one end of the heat pipe 111 extends out of the sealed compartment 104 and into the heat dissipation compartment 110. A plurality of heat dissipation fins 112 is mounted on the heat pipe 111 within the dissipation compartment 110 and a fan 114 is provided to blow ambient air over both the heat sink 106 and the dissipation fins 112 to effectively cool the SCR's 102. Alternating current is supplied across the back-to-back SCR's 102 by a lead 116 that is connected to one side 105 of the SCR's 102 through the heat sink 106 and by a lead 118 that is connected to the other side 109 of the SCR's 102 through the heat pipe 111.

Figure 7:
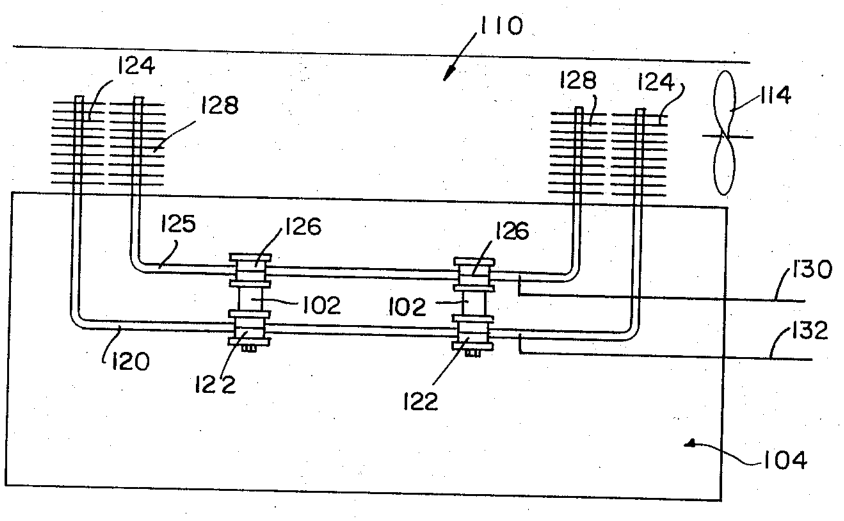
FIG. 7 is a schematic diagram of an alternative cooling arrangement for the solid state devices of the control circuit of FIG. 5.

Alternatively, heat pipes may be connected to both sides of the back-to-back SCR's 102 as shown in FIG. 7. In this embodiment, a heat pipe 120 is connected intermediate its length to each SCR 102. Both ends of the heat pipe 120 extend out of the sealed compartment 104 and into the heat dissipation compartment 110. Dissipation fins 124 are mounted on each end of the pipe 120 within the dissipation compartment 110. A second heat pipe 125 is similarly connected by saddles 126 to the other side of the back-to-back SCR's. The ends of this pipe 125 also extend out of the sealed compartment 104 into the heat dissipation compartment 110. The pipe 125 has dissipation fins 128 mounted near its ends and disposed within the dissipation compartment 110. Heat generated by the SCR's is carried out of the sealed compartment through the pipes 120 and 125 to dissipation fins 124 and 128. A fan 114 blows ambient air across the pair of fins 124 and 128 to effectively cool the SCR's. Alternating current is electrically supplied across the pair of SCR's, as by leads 130 and 132 that are connected to the saddles 122 and 126, respectively.

In accordance with the above description, heat pipes permit the SCR's in the primary to be isolated in sealed compartments for protection against corrosion, but still permit the devices to be cooled with small amounts of ambient air and with but a single electrical fan. The SCR's, diodes, or any other solid state devices that generate heat can be mounted in a sealed compartment and the heat generated thereby can be transferred to a remote point by a heat pipe for convenient and economical dissipation. This substantially reduces the size and cost of any solid state module since no liquid cooling network is required and no large air space surrounding each solid state device is necessary.

While this invention primarily relates to cooling of solid state rectifying devices with the use of heat pipes, cooling of the transformer has also been shown in the above description and accompanying drawings. It should be understood that the transformer need not necessarily be cooled by connecting heat pipes thereto, and, in fact, this invention can be adapted with little or no modification for any use requiring a direct current power supply utilizing solid state rectifying devices. A transformer need not even be a part of, or connected to, the power supply. Such uses primarily include direct current motor control, but may also include, and are not limited to, electrically operated furnaces and welding.

I claim:

1. A direct current power supply comprising: a first sealed compartment; a transformer having a primary and a secondary mounted within said first sealed compartment, said primary being electrically coupled to an external source of alternating current; a second sealed compartment; a plurality of solid state rectifying devices mounted within said second sealed compartment; coupling means for electrically coupling said plurality of solid state devices to said transformer; a heat dissipation compartment; and a heat pipe coupled to said transformer and to each of said plurality of solid state devices within their respective sealed compartments and extending therefrom directly out of said respective sealed compartments into said heat dissipation compartment, said heat pipe having a heat sink mounted thereon within said heat dissipation compartment so that heat generated by the transformer and by each of the solid state devices is directly absorbed by said heat pipe and transferred therethrough out of said first and second sealed compartments directly to the heat sink for dissipation within said heat dissipation compartment.

2. A direct current power supply as recited in claim 1 further comprising a fan operative to provide air flow through said heat dissipation compartment.

3. A direct current power supply as recited in claim 1 wherein the heat sink mounted on said heat pipe comprises a plurality of heat dissipation fins.

4. A direct current power supply as recited in claim 1 wherein the primary and the secondary of said transformer are single-phase.

5. A direct current power supply as recited in claim 1 wherein the primary and the secondary of said transformer are three-phase.

6. A direct current power supply as recited in claim 1 wherein said plurality of solid state rectifying devices is electrically coupled by said coupling means to the secondary of said transformer.

7. A direct current power supply as recited in claim 1 wherein said heat pipe includes said means for electrically coupling said plurality of solid state devices to said transformer.

8. A direct current power supply as recited in claim 1 wherein said solid state devices are diodes.

9. A direct current power supply as recited in claim 1 wherein said solid state devices are silicon controlled rectifiers.

10. A direct current power supply as recited in claim 9 wherein said silicon controlled rectifiers are electrically coupled by said coupling means to the primary of said transformer.

11. A direct current power supply as recited in claim 1 further comprising an auxiliary heat sink disposed within said heat dissipation compartment and thermally coupled to each of said solid state devices.

12. A direct current power supply as recited in claim 11 wherein each of said solid state devices has an anode and a cathode, and said heat pipe is thermally coupled to the anode of each of said solid state devices, and said auxiliary heat sink is thermally coupled to the cathode of each of said solid state devices.

13. A direct current power supply as recited in claim 11 wherein said auxiliary heat sink is mounted on said heat pipe.

14. A direct current power supply as recited in claim 11 wherein said auxiliary heat sink is mounted on said heat pipe and comprises a plurality of heat dissipation fins.

15. A direct current power supply comprising: a first sealed compartment; a transformer having a primary and a secondary mounted within said first sealed compartment, said primary being electrically coupled to an external source of alternating current; a second sealed compartment; a plurality of solid state rectifying devices mounted within said second sealed compartment;

coupling means for electrically coupling said plurality of solid state devices to the secondary of said transformer; a heat dissipation compartment; and a plurality of heat pipes coupled to said transformer and to each of said solid state rectifying devices within their respective sealed compartments and extending therefrom directly out of said respective sealed compartments into said heat dissipation compartment, each of said plurality of heat pipes having a heat sink mounted thereon within said heat dissipation compartment so that heat generated by the transformer and by each of the solid state devices is directly absorbed by said heat pipes and transferred therethrough out of said first and second sealed compartments directly to the heat sinks for dissipation within said heat dissipation compartment.

16. A direct current power supply as recited in claim 15 wherein each of said solid stat devices has an anode and a cathode, individual ones of said plurality of heat pipes being thermally coupled to the anode of individual ones of said solid state devices; and further comprising a plurality of auxiliary heat sinks disposed within said heat dissipation compartment, individual ones of said plurality of auxiliary heat sinks being thermally coupled through the wall of said second sealed compartment to the cathode of individual ones of said solid state devices.

17. A direct current power supply as recited in claim 15 wherein each of said solid state devices has an anode and a cathode, individual ones of said plurality of heat pipes being thermally coupled to the anode of individual ones of said solid state devices; and further comprising a second plurality of heat pipes each having a heat sink mounted thereon within said heat dissipation compartment, individual ones of said second plurality of heat pipes extending into said second sealed compartment and thermally coupled to the cathode of individual ones of said solid state devices.

18. A direct current power supply as recited in claim 17 wherein the heat sinks mounted on said second plurality of heat pipes each comprise a plurality of heat dissipation fins.

19. A direct current power supply as recited in claim 15 wherein said plurality of heat pipes includes said coupling means for electrically coupling said solid state devices to the secondary of said transformer.

20. A direct current power supply as recited in claim 15 wherein each of said plurality of heat pipes is thermally coupled at one end to said transformer and at the opposite end to one of said solid state devices, and the heat sink mounted on each of said plurality of heat pipes is mounted intermediate the length thereof.

21. A direct current power supply as recited in claim 15 further comprising a plurality of silicon controlled rectifiers mounted within one of said first and second sealed compartments; second coupling means for electrically coupling said silicon controlled rectifiers to the primary of said transformer, said silicon controlled rectifiers being operative to regulate and control the power supply output; and a second plurality of heat pipes coupled to each of said silicon controlled rectifiers within their sealed compartment and extending therefrom directly out of their sealed compartment and into said heat dissipation compartment, each of said second plurality of heat pipes having a heat sink mounted thereon within said dissipation compartment so that heat generated by each of said silicon controlled rectifiers is directly absorbed by said second plurality of heat pipes and is transferred therethrough directly to the heat sinks for dissipation within said heat dissipation compartment.

22. A direct current power supply as recited in claim 15 further comprising a third sealed compartment; a plurality of silicon controlled rectifiers mounted within said third sealed compartment; second coupling means for electrically coupling said silicon controlled rectifiers to the primary of said transformer, said silicon controlled rectifiers being operative to regulate and control the power supply output; and a second plurality of heat pipes coupled to each of said silicon controlled rectifiers within said third compartment and extending therefrom directly out of said third sealed compartment and into said heat dissipation compartment, each of said second plurality of heat pipes having a heat sink mounted thereon within said heat dissipation compartment so that heat generated by each of said silicon controlled rectifiers is directly absorbed by said second plurality of heat pipes and transferred therethrough out of said third compartment directly to the heat sinks mounted thereon for dissipation within said heat dissipation compartment.

23. A direct current power supply as recited in claim 15 further comprising a fan operative to provide air flow through said heat dissipation compartment.

24. A direct current power supply comprising: a transformer having a primary and a secondary, said primary being electrically coupled to an external source of alternating current; a plurality of solid state rectifying devices electrically coupled to said transformer, said transformer and said plurality of solid state devices being mounted within a plurality of sealed compartments; a heat dissipation compartment open to ambient air; and a heat pipe coupled to said transformer and to each of said solid state devices within their respective sealed compartments and extending therefrom directly out of said respective sealed compartments and into said heat dissipation compartment, said heat pipe having a heat sink mounted thereon within said heat dissipation compartment so that heat generated by the transformer and by each of the solid state devices is directly absorbed by said heat pipe and transferred therethrough out of the sealed compartments directly to the heat sink for dissipation within said heat dissipation compartment.

25. A direct current power supply comprising: a sealed compartment, a plurality of solid state rectifying devices mounted within said sealed compartment, said devices having first and second terminals, one of said first and second terminals being electrically coupled to an external source of alternating current and the other of said first and second terminals forming the output of the power supply; a heat dissipation compartment; and a heat pipe coupled to each of said solid state rectifying devices within said sealed compartment and extending therefrom directly out of said sealed compartment and into said heat dissipation compartment, said heat pipe having a heat sink mounted thereon within said heat dissipation compartment so that heat generated by solid state rectifying devices is directly absorbed by said heat pipe and transferred therethrough out of said sealed compartment directly to said heat sink for dissipation within said heat dissipation compartment.

26. A direct current power supply comprising: first and second sealed compartments; a transformer having a primary and a secondary mounted within said first compartment and electrically coupled to an external source of alternating current; a plurality of solid state rectifying devices mounted within said second compartment; a heat dissipation compartment open to ambient air; a plurality of electrically conductive heat pipes extending through said heat dissipation compartment and into each of said first and second sealed compartments, each of said heat pipes having one end electrically and thermally coupled to said transformer and the other end electrically and thermally coupled to one of said solid state devices, each of said heat pipes having a heat sink mounted thereon within said heat dissipation compartment so that heat generated by the transformer and by each of said solid state devices is directly absorbed by said heat pipes and transferred therethrough out of said first and second sealed compartments directly to the heat sinks for dissipation within said heat dissipation compartment.

* * * * *